United States Patent
Helgeson et al.

(10) Patent No.: US 7,918,310 B1
(45) Date of Patent: Apr. 5, 2011

(54) NOISE ATTENUATION DEVICE FOR REDUCING JET ENGINE NOISE DURING TESTING

(75) Inventors: Norman L. Helgeson, Pacific Palisades, CA (US); Steven Fann, West Hills, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 12/552,771

(22) Filed: Sep. 2, 2009

(51) Int. Cl.
*B64F 1/26* (2006.01)
*F01N 1/08* (2006.01)
*F01N 1/14* (2006.01)
*B64F 1/00* (2006.01)
*F01N 1/00* (2006.01)

(52) U.S. Cl. ........ 181/218; 181/217; 181/210; 181/203; 181/265; 244/114 B

(58) Field of Classification Search ................. 181/218, 181/217, 210, 203, 265, 267, 258, 224–228, 181/268; 244/114 B
See application file for complete search history.

(56) References Cited

U.S. PATENT DOCUMENTS

| | | | | |
|---|---|---|---|---|
| 750,011 A * | 1/1904 | Willis | 181/265 |
| 830,660 A * | 9/1906 | Goldman | 181/268 |
| 1,922,848 A * | 8/1933 | Harley | 181/264 |
| 2,396,952 A * | 3/1946 | Huber | 181/259 |
| 2,721,619 A * | 10/1955 | Cheairs | 181/244 |
| 2,810,449 A * | 10/1957 | Coleman | 181/218 |
| 2,823,756 A * | 2/1958 | Bridge et al. | 181/203 |
| 2,936,846 A * | 5/1960 | Tyler et al. | 181/217 |
| 2,940,537 A * | 6/1960 | Smith et al. | 181/218 |
| 2,979,151 A * | 4/1961 | Blackwell et al. | 181/217 |
| 3,174,581 A * | 3/1965 | Duthion et al. | 181/217 |
| 3,185,252 A * | 5/1965 | Lemmerman | 181/217 |
| 3,187,835 A * | 6/1965 | Smith | 181/217 |
| 3,195,678 A * | 7/1965 | Morgan et al. | 181/221 |
| 3,306,394 A * | 2/1967 | Smith et al. | 181/217 |
| 3,404,750 A * | 10/1968 | Powers et al. | 181/228 |
| 3,688,865 A * | 9/1972 | Smith et al. | 181/218 |
| 3,752,260 A * | 8/1973 | Heath | 181/228 |
| 4,226,298 A * | 10/1980 | Bancel et al. | 181/226 |
| 4,589,515 A * | 5/1986 | Omura | 181/227 |
| 4,705,138 A * | 11/1987 | Reese | 181/212 |
| 4,792,014 A * | 12/1988 | Shin-Seng | 181/280 |
| 5,371,331 A * | 12/1994 | Wall | 181/227 |
| 5,925,857 A * | 7/1999 | Birkel et al. | 181/250 |
| 6,220,387 B1 * | 4/2001 | Hoppes et al. | 181/259 |
| 6,237,395 B1 * | 5/2001 | Helgeson | 73/23.31 |
| 6,968,923 B2 * | 11/2005 | Schmaeman | 181/252 |

* cited by examiner

*Primary Examiner* — Edgardo San Martin
(74) *Attorney, Agent, or Firm* — David S. Kalmbaugh; Christopher L. Blackburn

(57) ABSTRACT

A noise attenuation device for testing a jet engine.

20 Claims, 4 Drawing Sheets

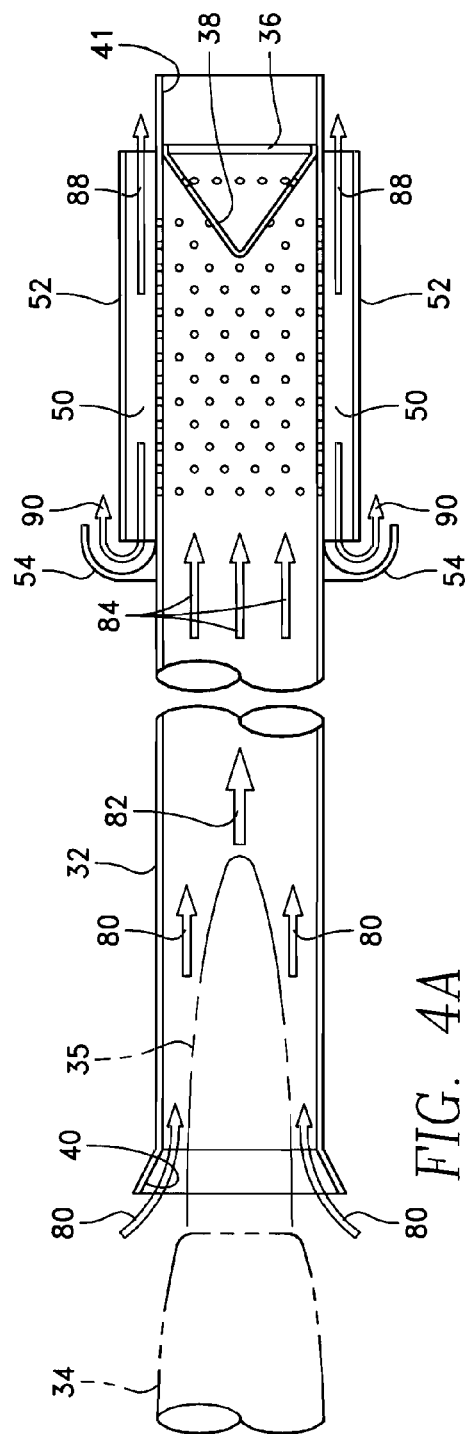
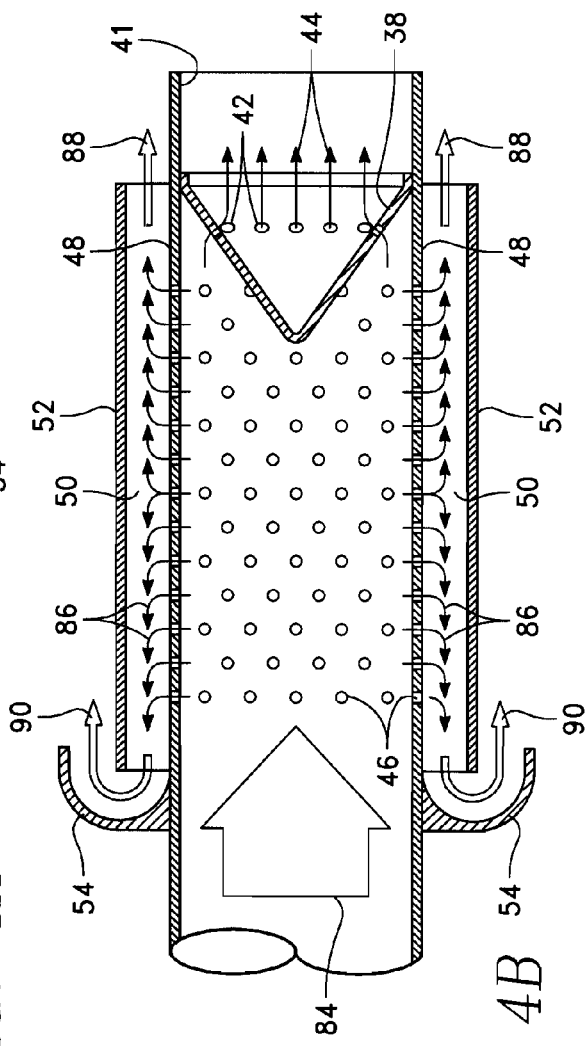
FIG. 4A
FIG. 4B

NOISE ATTENUATION DEVICE FOR REDUCING JET ENGINE NOISE DURING TESTING

BACKGROUND OF THE INVENTION

1. Field of the Invention

The present invention relates generally to the testing of jet engines. More particularly, the present invention relates to testing a jet engine in an outdoor environment while substantially attenuating the noise caused by testing the jet engine.

2. Description of the Prior Art

Noise from jet engine testing can cause auditory health effect including hearing loss and deafness, as well as non-auditory health effects such hypertension and nervous disorders. This type of noise also disturbs sleep of individuals in proximity to the test site; affects the performance of children in school and decreases the value of real estate surrounding the test site. In addition, noise from jet engine testing is one of the most common sources of tensions between surrounding communities and military air bases, and the military needs to aggressively pursue any and all available means to reduce its impact.

Typical sound levels for noise varies from 60 dBA for normal conversation to 70 dBA for vacuum cleaner to 130 dBA or more for a jet engine at 100 feet. OSHA (Occupational Safety and Health Administration) regulations require that engineering controls be used or that personal protective equipment be provided for a worker exposed to sound levels greater than 85 dBA for more than 8 hours.

As military aircraft engines become more powerful and noisier, as aircraft operations expand, and as land areas proximate to military operational bases are developed for commercial and residential use, jet engine testing noise and other issues create substantial disagreement and tension between the military and local officials.

Thus, there is an urgent need to significantly reduce jet engine noise by up to 20 dBA during static testing of a jet engine. There is also a need to provide the military with a new state of the art device for testing jet engines which is relatively inexpensive and also brings jet engine ground noise limits within acceptable limits to surrounding communities.

SUMMARY OF THE INVENTION

The present invention overcomes some of the difficulties of the past, including those mentioned above, in that it comprises a relatively simple design and is a highly effective device for testing jet engines in an open air environment. The noise attenuation device comprising the present invention reduces the noise level of the jet exhaust from the engine under static testing to a level acceptable for surrounding environments.

The noise attenuation device of the present invention comprises an empty carbon steel pipe of predetermined length and diameter. The jet engine under test is positioned within the front end portion of the carbon steel pipe. Located at the rear end of the carbon steel pipe is a blockage cone. The blockage cone used in the noise attenuation device may be either a full blockage cone or a partial blockage cone with openings.

Cold air enters the front end of the carbon-steel pipe at a temperature of approximately 70 degrees Fahrenheit and has a mass of approximately three times the mass of the hot jet engine exhaust. By adding three times the mass of cold air to that of the hot jet engine exhaust, the hot jet exhaust becomes intimately mixed with the cold air forming a jet engine exhaust-cool air mixture. When the jet engine exhaust-cool air mixture from a jet engine operating at after-burner conditions reaches the outlet end of the carbon steel pipe its temperature is reduced from 3800° F. to less than 1200° F., the design limit required to protect the noise attenuation device.

Adding the cold air mass to the jet engine exhaust reduces the average velocity of the resulting mixture stream by a factor of about four. Reducing the velocity of the jet engine exhaust flow reduces the intensity of turbulent fluctuations and the acoustic power produced by the jet engine exhaust plume.

The cross sectional flow area in the rear portion of the carbon steel pipe increases for the jet engine exhaust-cool air mixture to more than double. A substantial portion of the flow of the jet engine exhaust-cool air mixture is forced through openings within perforated side walls located in the rear end portion of the carbon-steel pipe.

An annular region through which the exhaust-cool air mixtures flows is formed between the side plates and a shroud which surrounds the rear end portion of the carbon-steel pipe. The gas flow pattern of the exhaust-cool air mixture is in both a forward direction and a rearward direction. A flow deflector attached to the carbon-steel pipe is positioned at the front end of shroud. The flow deflector forces the exhaust-cool air mixture exiting the forward end of the shroud to reverse direction and flow in the same direction as exhaust-cool air mixture exiting the rear end of shroud.

The annular region formed between the shroud and the inner carbon steel pipe provides greater flow area, slowing the velocity of the jet engine exhaust-cool air mixture and reducing the power of noise produced by the jet engine.

BRIEF DESCRIPTION OF THE DRAWINGS

FIGS. 4A and 4B depict the gas flow pattern of the jet engine exhaust plume within the noise attenuation device of FIG. 1.

DETAILED DESCRIPTION OF A PREFERRED EMBODIMENT

Figure 1:
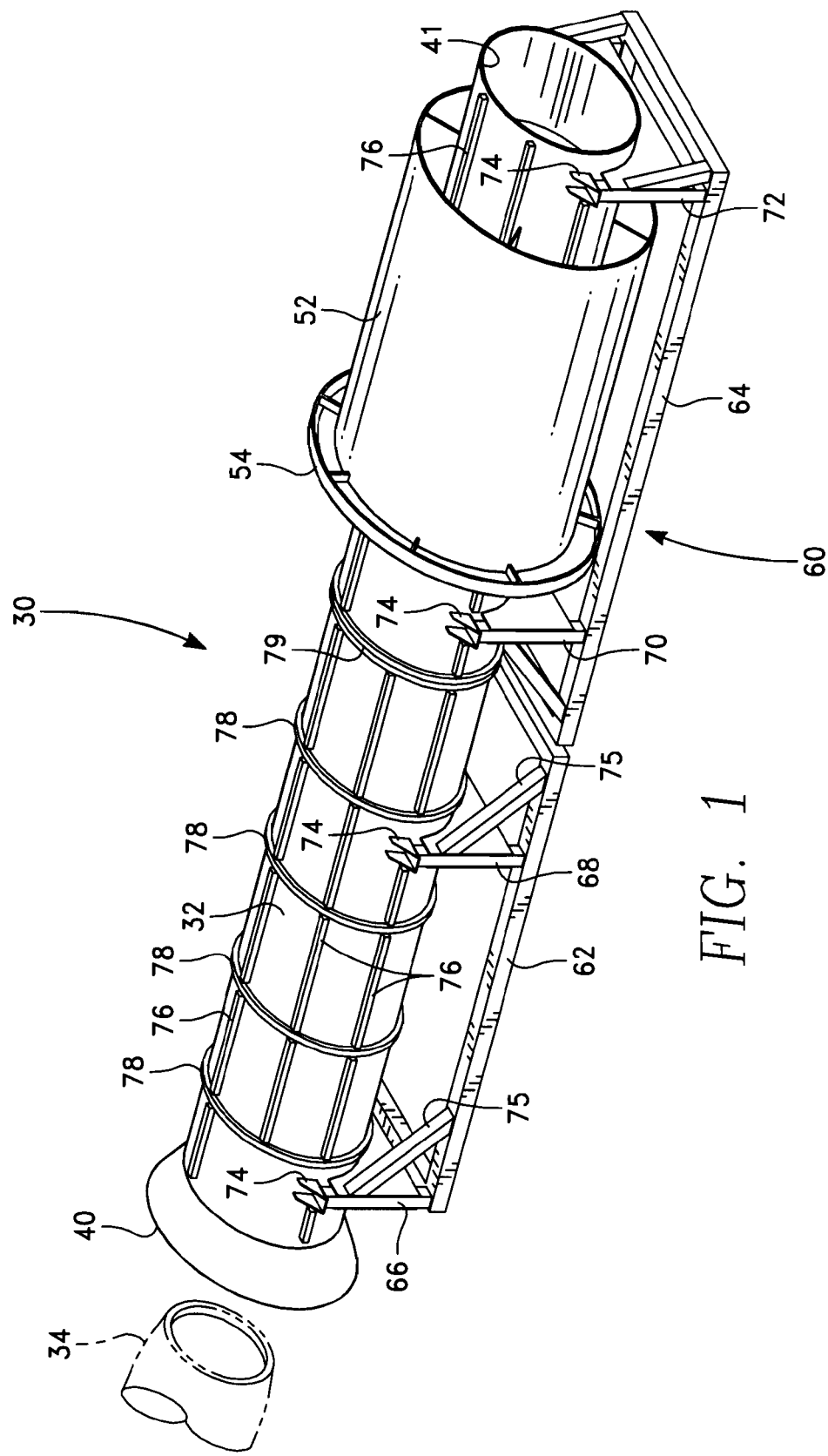
FIG. 1 is a view in perspective of the noise attenuation device for testing jet engines comprising a preferred embodiment of the present invention.

Referring to FIGS. 1, 4A and 4B, the full scale cylindrical-shaped noise attenuation device 30, which is 51 feet in length, has a diameter of 6 to 14 feet, weighs approximately 25 tons, and is fabricated from empty sections of carbon-steel pipe 32. The carbon-steel tube 32 has an inside diameter of approximately 6 feet and is formed of ½ inch thick carbon-steel plate.

Noise attenuation device 30 incorporates fluid dynamic control elements to catch, slow and deflect the jet engine exhaust plume 35 from a jet engine 34. The carbon-steel tube 32 is aligned axially with the direction of jet engine exhaust flow from the exhaust port of a jet engine 34 under going a static performance test.

The slowing of the jet engine exhaust plume 35 from jet engine 34 operates to reduce the intensity of otherwise persistent noise-generating turbulent eddies from the jet, thereby reducing the noise produced by the static testing of the jet engine 34.

As is best seen in FIG. 1, the noise attenuation device is mounted on a test support structure 60. The test support structure 60 has a rectangular shaped base 62 in the forward portion of the structure 60 and another rectangular shaped base 64 in the rear portion of the structure 60. Supporting two sections of the noise attenuation device 30 joined to each other by a connection flange 79, base 62 of test support structure 60 includes a pair of vertically orientated support cradles 66 and 68 which are located near the front and rear end of base 62. Base 64 of test support structure 60 also includes a pair of vertically orientated support cradles 70 and 72 which are located near the front and rear end of base 64. The two sections of the empty carbon-steel pipe 32 of noise attenuation device 30 rest on the cradles 66, 68, 70 and 72 of test support structure 60 in the manner illustrated in FIG. 1. Angled support members 75, angled at approximately forty five degrees, are provided for each of the cradles 66, 68, 70 and 72 to insure stability of the cradles 66, 68, 70 and 72 during the static testing of a jet engine. Each cradle 66, 68, 70 and 72 also has a pair of clamping devices 74 which secure carbon-steel pipe 32 to each cradle 66, 68, 70 and 72 of the test structure 60. The centerline of the carbon-steel tube 32 is positioned approximately 5'-2" above the ground when the carbon-steel tube 32 is portioned on the support structure 60 in the manner shown in FIG. 1.

Referring again to FIGS. 1, 4A and 4B, FIGS. 4A and 4B shows the gas flow field through the noise attenuation device 30. The technical objective of the noise attenuation device 30 (as shown in FIGS. 4A and 4B) is to ensure a safe and acceptable flow of the jet exhaust plume 35 through the interior of the noise attenuation device 30 and to reach acceptable noise reduction levels. To meet this technical objective, the noise attenuation device 30 is designed to: (1) slow jet exhaust by mixing jet engine exhaust with entrained air (momentum exchange); (2) cool exhaust at 3800° F. with a 3:1 ratio of entrained air (thermal mixing); and (3) convert velocity head to pressure head for changing flow directions within the noise attenuation device 30, shroud 52 and flow deflector 54.

The exhaust of the jet engine 34 under test is positioned near the front end portion 40 of the carbon-steel pipe 32 of device 30. As seen in FIG. 4A, the front end portion 40 of carbon-steel pipe 32 is angled outward to provide for adequate air flow of cold air from the atmosphere. It should be noted the diameter of the angled front end portion 40 of device 30 is 7 feet 10⅞ inches at its maximum width.

The cold air 80 entering the carbon-steel pipe 32 (represented by arrows 80) is at a temperature of approximately 70 degrees Fahrenheit and has a mass of approximately three times the mass of the hot jet engine exhaust (represented by arrow 82). By adding three times the mass of cold air 80 to that of the hot jet exhaust which reaches 3800° F., the hot jet exhaust becomes intimately mixed (as represented by arrows 84) with the cold air forming a jet engine exhaust-cool air mixture 84.

The length and diameter of the noise attenuation device 30 are sized to accommodate the gas mixing and cooling process within the carbon-steel pipe 32 (approximately 51 feet in length and a pipe radius of approximately of 3 feet 9 5/16 inches). When the hot jet engine exhaust-cool air mixture 84 reaches the outlet end 41 of pipe 32, its temperature is reduced to less than 1200° F. which is the design limit set to protect the noise attenuation device 30 structural elements from overheating during the short time periods of engine operation at after-burner power.

To ensure adequate slowing of the exhaust plume 35 from the jet engine 24 being tested, the outlet end 36 of pipe 32 of the noise attenuation device 30 is blocked or partially blocked by a blockage cone 38. The blockage cone 38 used in the noise attenuation device 30 may be either a full blockage cone or a partial blockage cone with openings. The blockage cone 38 illustrated in FIG. 4B includes a plurality of openings 42 which allow a portion of the jet exhaust-cool air mixture to exit the outlet end 36 of the noise attenuation device 30 through partial blockage cone 38 (in the manner illustrated by arrows 44). Depending upon the type of engine currently being tested, the blockage cone 38 will either include or exclude the openings 42. For example, when a Pratt and Whitney J-52 turbojet engine is being tested a full blockage cone is used for the test. Similarly, when a General Electric F-404 engine is being tested a partial blockage cone of the type illustrated in FIG. 4B is used for the test.

Referring to FIG. 4B, FIG. 4B shows that the flow of the exhaust plume 35 does not have a clear shot at proceeding through the noise attenuation device 30 without significant slowing of the jet engine exhaust. The cross sectional flow area for the jet engine exhaust is more than doubled as a substantial portion of the flow of the jet engine exhaust-cool air mixture 84 is forced through openings 46 (FIG. 4B) within perforated side plates/walls 48 located in the rear portion of the carbon-steel pipe 32. Arrows 86 indicate the flow pattern of the jet engine exhaust through the openings 46 within side walls 48 into an annular gas flow region 50 surrounding the rear end portion of carbon-steel pipe 32.

As seen in FIGS. 4A and 4B, the side plates 48 and shroud 52 which surrounds the rear end portion of the carbon-steel pipe 32 forms an annular region through which exhaust flows. Also as seen in FIGS. 4A and 4B, the gas flow pattern is in both a forward direction and a rearward direction which is indicated by arrows 88 and 90. A flow deflector 54 attached to the carbon-steel pipe 32 is positioned at the front end of shroud 52. The flow deflector 54 forces jet engine exhaust exiting the forward end of shroud 52 to reverse direction and flow in the same direction as jet engine exhaust exiting the rear end of shroud 52.

Thus, it can be seen that a portion of the jet engine exhaust is forced to change flow direction twice before exiting noise attenuation device 30 (in the manner indicted by arrows 90). Changing flow direction requires pressure differentials and the required pressure head is obtained from that of the high velocity jet engine exhaust.

With respect to the noise attenuation device 30, pressure is recovered by a diffuser effect. The pressure head recovered is used to turn and maintain the flow of engine exhaust through the perforated side walls 48 and turn the engine exhaust back again to an axial direction in the annular region 50 of noise attenuation device 30. This slows the flow of the exhaust, reducing the power of noise producing flow turbulence and functions as a shroud for the major noise producing regions of the jet engine 34.

In the preferred embodiment, the perforated side walls 48 are located approximately 35 feet from the front end portion 40 of the carbon-steel pipe 32.

Intensity of noise produced by a jet is highly dependent on the velocity of the jet. At the high velocities characteristic of military jet engine exhausts (2000-4500 ft/second), the conversion of kinetic flow energy to acoustic noise dramatically increases with velocity. Noise attenuation device 30 reduces velocity by capturing the exhaust plume 35 in a tunnel formed within the interior of carbon steel pipe 32 and mixing the jet engine exhaust 82 in a confined region (interior of the carbon steel pipe 32) with approximately three times the mass of cold air as the quantity of jet engine exhaust 82 flow. Adding the cold air mass (represented by arrow 80) to the jet engine exhaust 82 reduces the average velocity of the resulting mixture stream (represented by arrows 84) by a factor of about four. By reducing the velocity of the jet engine exhaust flow the intensity of turbulent fluctuations is reduced and the acoustic power emitted by the jet engine 34 is also dramatically reduced.

Figure 2:
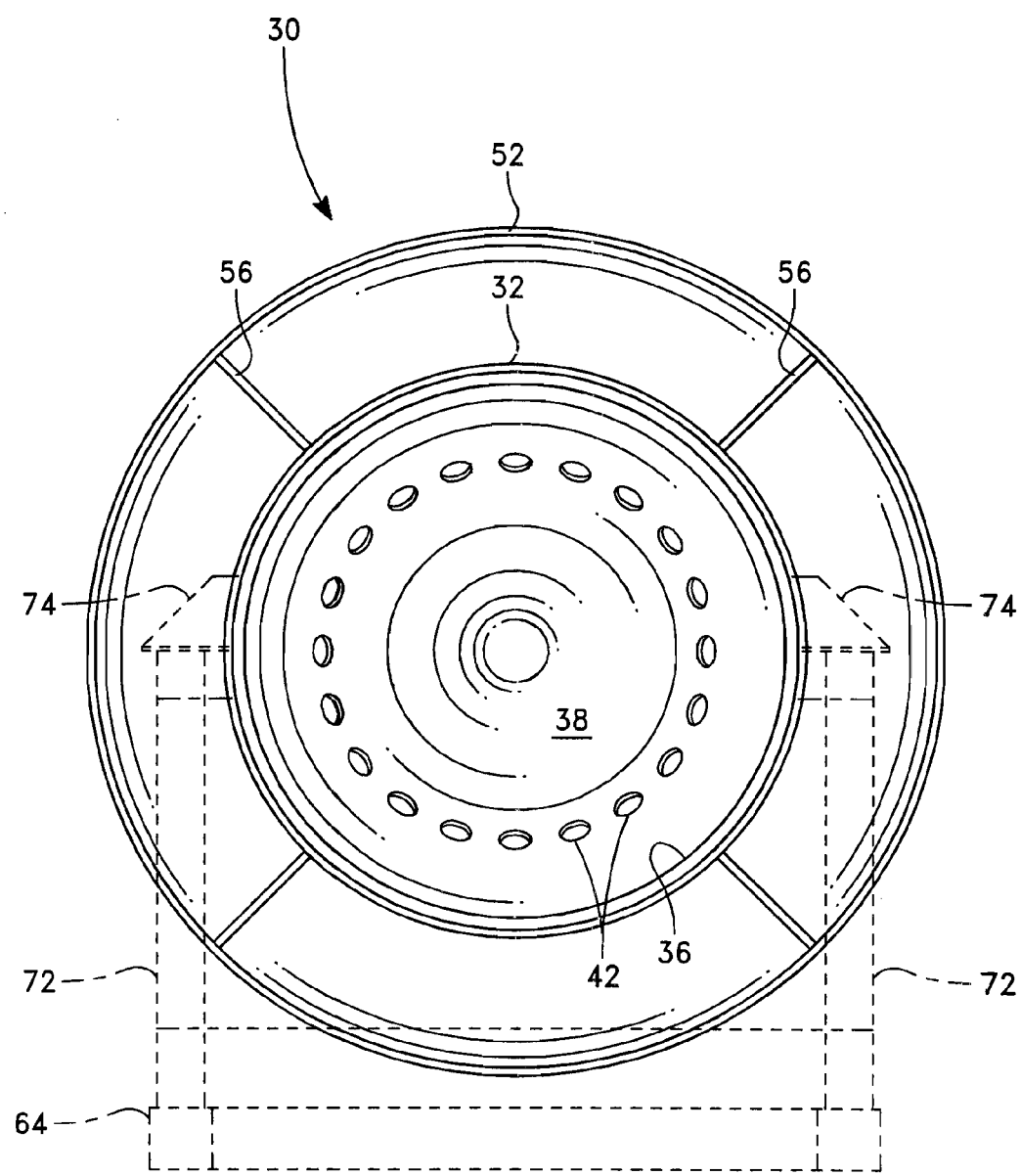
FIG. 2 is an end view of the noise attenuation device of FIG. 1 without a flow deflector.
Figure 3:
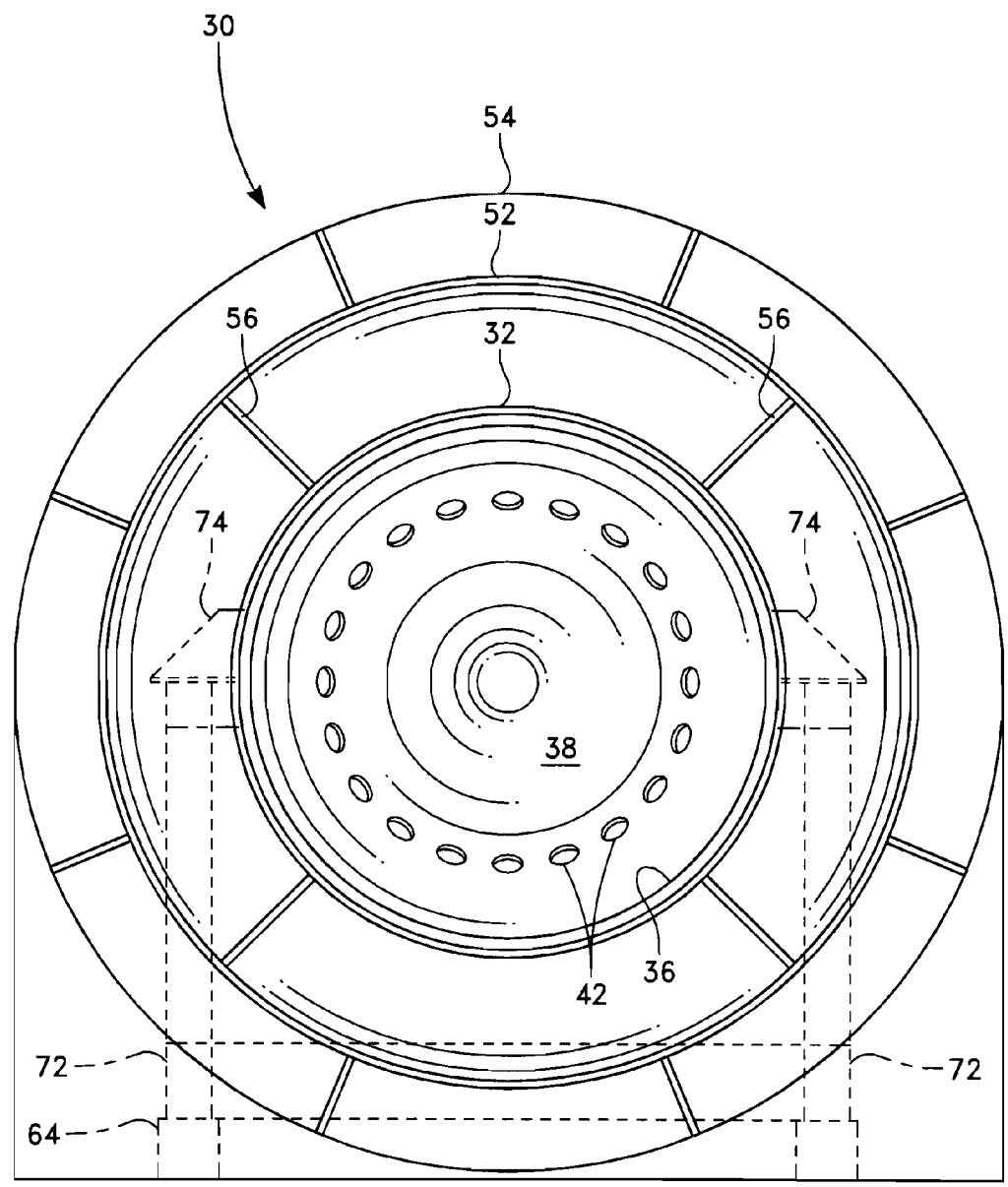
FIG. 3 is an end view of the noise attenuation device of FIG. 1 with a flow deflector.

Referring to FIGS. 2 and 3, noise attenuation device 30 is depicted in FIG. 2 with the shroud 52 which surrounds the rear end portion of the carbon-steel pipe 32. Shroud 52 is attached to the carbon-steel pipe 32 by four equally spaced ½" thick support plates/fins 56. The support fins 56 are attached to the outer surface of the carbon steel pipe 32 and the inner surface of the shroud 52 by welds (not shown). Utilizing the support fins 56 in the manner illustrated in FIG. 2 allows for substantially unrestricted jet engine exhaust flow within the annular gas flow region 50 (as shown in FIG. 4B).

FIG. 3 depicts the noise attenuation device 30 with the shroud 52 which surrounds the rear end portion of the carbon-steel pipe 32 and the flow deflector 54 which is attached to the carbon-steel pipe 32 and is positioned at the front end of the shroud 52. Also shown in FIGS. 2 and 3 in phantom is one of the cradles 72 and its associated clamps 74.

Field testing of the noise attenuation device 30 and the flow deflector 54 with the Lockheed F-404 engine were completed for engine power levels up to and including after-burner, proving the adequacy and operation of the flow deflector 54 for use in noise attenuation during the static testing of a jet engine. Noise measurements were recorded at five engine power levels. These measurements showed increasing noise reductions with increasing engine power in both near field and far field locations reaching total noise reductions greater than 20 dBA at after burner conditions for both locations.

Near field measurements were made at approximately ninety feet from the noise attenuation device and the jet engine under test. Far field measurements were taken at approximately two miles from the noise attenuation device and the jet engine under test. The insertion loss for the near field measurements reached a maximum of 20.6 dBA at maximum after-burner. Testing without noise attenuation device 30 resulted in a noise level of 138 dBA while testing with noise attenuation device 30 resulted in a noise level of 117.4 dBA, with the difference being 20.6 dBA at maximum after-burner. The insertion loss for the far field measurements reached a maximum of 34.3 dBA at maximum after-burner. Testing without noise attenuation device 30 resulted in a noise level of 74.1 dBA while testing with noise attenuation device 30 resulted in a noise level of 39.8 dBA, with the difference being 34.3 dBA at maximum after-burner.

Noise attenuation device 30 was constructed of carbon steel with an upper service temperature of approximately 1200° F. while noise attenuation device 30 is designed to be subjected to an operating environment for testing the General Electric F-414 jet engine at after burner conditions of 3900° F. Noise attenuation device 30 is not exposed to these extreme temperature conditions for long periods of time, but exposure times of even a few minutes at after burner temperature conditions would cause rapid degradation of the carbon steel pipe 32. To address this concern, sufficient air (approximately 3:1 mass ratio) s needed to be entrained into the noise attenuation device 30 to provide an jet engine exhaust gas/cool air mixture which, when fully mixed, will have an average temperature that does not exceed 1200° F.

Further, the noise attenuation device structure to prevent structural resonance problems caused by the intense vibrational testing of the jet engine. The design of the noise attenuation device structure includes (a) longitudinal segments of the main body of noise attenuation device 30 being broken into uneven lengths to reduce and eliminate full or partial length longitudinal resonant body frequencies, and (b) numerous longitudinal reinforcing bracing bars 76 and circumferential reinforcing bracing bars 78 were added to the structure to reduce and eliminate resonant frequencies that can occur in isolated regions of the structure.

As previously discussed, the carbon-steel pipe 32 has a front end section and a back end section which are attached to each other by a front and back joining flange 79 which is shown in FIG. 1.

From the foregoing, it may readily be seen that the present invention comprises a new unique and exceedingly useful noise attenuation device for use in testing a jet engine which constitutes a considerable improvement over the known prior art for outdoor testing of jet engines on test stands. Many modifications and variations of the present invention are possible in light of the above teachings. It is to be understood that within the scope of the appended claims the invention may be practiced otherwise than as specifically described.

What is claimed is:

1. A noise attenuation device for reducing noise generated by a jet engine under going static testing comprising:
   (a) a carbon-steel pipe having a predetermined length and a predetermined diameter, wherein said carbon-steel pipe is adapted to receive the jet engine under going static testing and said carbon-steel pipe is aligned axially with the direction of exhaust flow from an exhaust port of said jet engine;
   (b) said carbon-steel pipe having a front end which is angled outward to provide for adequate air flow of cold air into said carbon-steel pipe from the atmosphere, an interior which receives the cold air from the atmosphere, and a rear end, the exhaust port of said jet engine being positioned at the front end of said carbon-steel pipe, wherein the cold air enters the front end of the carbon-steel pipe at a temperature of approximately 70 degrees Fahrenheit, and has a mass of approximately three times the mass of the hot jet engine exhaust from exhaust port of said jet engine;
   (c) said carbon-steel tube having an elongated interior for receiving the cold air from the atmosphere and the hot jet engine exhaust from said jet engine and then mixing the hot jet engine exhaust with the cold air forming a jet engine exhaust-cool air mixture;
   (d) said carbon-steel tube having a rear end portion which includes a plurality of perforated side plates and a rear end which has a blockage cone, wherein said jet engine exhaust-cool air mixture cools from 3800 EF to less than 1200 EF as said jet engine exhaust-cool air mixture travels through the interior of said carbon-steel pipe;
   (e) a shroud positioned around the exterior of the rear end portion of said carbon-steel tube, said shroud having a flow deflector positioned at the front end of said shroud, wherein an annular region is formed between said perforated side plates and the shroud which surrounds the rear end portion of said carbon-steel pipe;
   (f) a blockage cone positioned at rear end of the rear end portion of said carbon-steel pipe, wherein said blockage cone assists in forcing a substantial portion of the flow of the jet engine exhaust-cool air mixture through openings within said perforated side walls into said annular region;
   (g) said annular region slowing average velocity of the jet engine exhaust-cool air mixture and substantially reducing noise produced by said jet engine; and
   (h) said flow deflector forcing said jet engine exhaust-cool air mixture exiting the front end of said shroud to reverse direction and flow in a rearward direction which is the same direction said jet engine exhaust-cool air mixture flows exiting the rear end of said shroud.

2. The noise attenuation device of claim 1 wherein adding cold air mass to the hot jet engine exhaust reduces the average velocity of the jet engine exhaust-cool air mixture by a factor of about four which reduces an intensity of turbulent fluctuations and acoustic power produced by an exhaust plume from said jet engine exhaust plume.

3. The noise attenuation device of claim 1 wherein the predetermined length of said carbon-steel pipe is approximately fifty feet and the predetermined diameter of said carbon-steel pipe is approximately six feet.

4. The noise attenuation device of claim 1 wherein noise reduction levels for said jet engine undergoing said static testing are greater than 20 dBA at after burner conditions for near field measurements and far field measurements, said near field measurements being made at approximately ninety feet from said noise attenuation device and said far field measurements were made at approximately two miles from said noise attenuation device.

5. The noise attenuation device of claim 1 wherein said carbon-steel pipe has a front end section and a back end section which are attached to each other by a front and back joining flange.

6. The noise attenuation device of claim 1 further comprising a plurality of longitudinal reinforcing bracing bars and a plurality of circumferential reinforcing bracing bars affixed to the outside surface of said carbon-steel pipe to reduce and eliminate resonant frequencies which may otherwise occur in isolated regions of said noise attenuation device.

7. The noise attenuation device of claim 1 further comprising a test support structure having a first rectangular shaped base in a forward portion of the said test support structure and a second rectangular shaped base in a rear portion of said test support structure, each of said first and second rectangular shaped bases including a pair of vertically orientated support cradles which are located near the front and rear ends of said first and second rectangular shaped bases, wherein two sections of said carbon-steel pipe of said noise attenuation device rest on the support cradles of said first and second rectangular shaped bases.

8. The noise attenuation device of claim 7 wherein each support cradle includes:
 (a) a pair of clamping devices which secure said carbon-steel pipe to each support cradle of said first and second rectangular shaped bases; and
 (b) a pair of angled support members, angled at approximately forty five degrees, to insure stability of said cradles during the static testing of said jet engine.

9. The noise attenuation device of claim 1 wherein said blockage cone for said noise attenuation device is a full blockage cone which prevents said jet engine exhaust-cool air mixture from exiting the rear end of said carbon-steel pipe.

10. The noise attenuation device of claim 1 wherein said blockage cone for said noise attenuation device is a partial blockage cone having a plurality of openings which allows a portion of said jet engine exhaust-cool air mixture to exit the rear end of said carbon-steel pipe.

11. A noise attenuation device for reducing noise generated by a jet engine under going static testing comprising:
 (a) a carbon-steel pipe having a predetermined length and a predetermined diameter, the predetermined length of said carbon-steel pipe being approximately fifty feet and the predetermined diameter of said carbon-steel pipe being approximately six feet, wherein said carbon-steel pipe is adapted to receive the jet engine under going static testing and said carbon-steel pipe is aligned axially with the direction of exhaust flow from an exhaust port of said jet engine;
 (b) said carbon-steel pipe having a front end which is angled outward to provide for adequate air flow of cold air into said carbon-steel pipe from the atmosphere, an interior which receives the cold air from the atmosphere, and a rear end, the exhaust port of said jet engine being positioned at the front end of said carbon-steel pipe, wherein the cold air enters the front end of the carbon-steel pipe at a temperature of approximately 70 degrees Fahrenheit, and has a mass of approximately three times the mass of the hot jet engine exhaust from exhaust port of said jet engine;
 (c) said carbon-steel tube having an elongated interior for receiving the cold air from the atmosphere and the hot jet engine exhaust from said jet engine and then mixing the hot jet engine exhaust with the cold air forming a jet engine exhaust-cool air mixture;
 (d) said carbon-steel tube having a rear end portion which includes a plurality of perforated side plates and a rear end which has a blockage cone, wherein said jet engine exhaust-cool air mixture cools from 3800 EF to less than 1200 EF as said jet engine exhaust-cool air mixture travels through the interior of said carbon-steel pipe;
 (e) a shroud positioned around the exterior of the rear end portion of said carbon-steel tube, said shroud having a flow deflector positioned at the front end of said shroud, wherein an annular region is formed between said perforated side plates and the shroud which surrounds the rear end portion of said carbon-steel pipe;
 (f) a blockage cone positioned at rear end of the rear end portion of said carbon-steel pipe, wherein said blockage cone assists in forcing a substantial portion of the flow of the jet engine exhaust-cool air mixture through openings within said perforated side walls into said annular region;
 (g) said annular region slowing average velocity of the jet engine exhaust-cool air mixture and substantially reducing noise produced by said jet engine; and
 (h) said flow deflector forcing said jet engine exhaust-cool air mixture exiting the front end of said shroud to reverse direction and flow in a rearward direction which is the same direction said jet engine exhaust-cool air mixture flows exiting the rear end of said shroud;
 (i) a test support structure having a first rectangular shaped base in a forward portion of the said test support structure and a second rectangular shaped base in a rear portion of said test support structure, each of said first and second rectangular shaped bases including a pair of vertically orientated support cradles which are located near the front and rear end of said first and second rectangular shaped bases, wherein two sections of said carbon-steel pipe of said noise attenuation device rest on the support cradles of said first and second rectangular shaped bases and the two sections of said carbon-steel pipe are attached to each other by a front and back joining flange;
 (j) each of said support cradles including a pair of clamping devices which secure said carbon-steel pipe to each support cradle of said first and second rectangular shaped bases, and a pair of angled support members, angled at approximately forty five degrees, to insure stability of said cradles during the static testing of said jet engine; and
 (k) said noise attenuation device providing for noise reduction levels for said jet engine undergoing said static testing of at least 20 dBA at after burner conditions for near field measurements and far field measurements, said near field measurements being made at approximately ninety feet from said noise attenuation device and said far field measurements were made at approximately two miles from said noise attenuation device.

12. The noise attenuation device of claim 11 wherein adding cold air mass to the hot jet engine exhaust reduces the average velocity of the jet engine exhaust-cool air mixture by a factor of about four which reduces an intensity of turbulent fluctuations and acoustic power produced by an exhaust plume from said jet engine exhaust plume.

13. The noise attenuation device of claim 11 further comprising a plurality of longitudinal reinforcing bracing bars and a plurality of circumferential reinforcing bracing bars affixed to the outside surface of said carbon-steel pipe to reduce and eliminate resonant frequencies which may otherwise occur in isolated regions of said noise attenuation device.

14. The noise attenuation device of claim 11 wherein said blockage cone for said noise attenuation device is a full blockage cone which prevents said jet engine exhaust-cool air mixture from exiting the rear end of said carbon-steel pipe.

15. The noise attenuation device of claim 11 wherein said blockage cone for said noise attenuation device is a partial blockage cone having a plurality of openings which allows a portion of said jet engine exhaust-cool air mixture to exit the rear end of said carbon-steel pipe.

16. A method for reducing noise generated by a jet engine under going static testing comprising the steps of:
  (a) providing a carbon-steel pipe having a predetermined length and a predetermined diameter, wherein said carbon-steel pipe is adapted to receive an exhaust port of the jet engine under going static testing and said carbon-steel pipe is aligned axially with the direction of exhaust flow from the exhaust port of said jet engine;
  (b) positioning the exhaust port of said jet engine at the front end of said carbon-steel pipe, wherein the front end of said carbon-steel pipe is angled outward to allow cold air to flow from the atmosphere into the interior of said carbon-steel pipe;
  (c) providing said cold air through the front end of said carbon-steel pipe to an elongated interior of said carbon-steel pipe at a temperature of approximately 70 degrees Fahrenheit, wherein said cold air entering the interior of said carbon-steel pipe has a mass of approximately three times the mass of hot jet engine exhaust from the exhaust port of said jet engine;
  (d) receiving the cold air from the atmosphere and the hot jet engine exhaust from said jet engine, wherein the elongated interior of said carbon-steel pipe receives said cold air and said hot jet engine exhaust;
  (e) mixing the hot jet engine exhaust with the cold air forming a jet engine exhaust-cool air mixture, wherein mixing the hot jet engine exhaust with the cold air reduces the temperature of said jet engine exhaust-cool air mixture from about 3800 EF to about 1200 EF as said jet engine exhaust-cool air mixture travels through the elongated interior of carbon-steel pipe;
  (f) reducing an average velocity of said jet engine exhaust-cool air mixture by a factor of about four by adding cold air mass to said hot jet engine exhaust, wherein reducing the average velocity of said hot jet engine exhaust reduces an intensity of turbulent fluctuations and acoustic power produced by said hot jet engine exhaust;
  (g) providing a plurality of perforated side plates located in a rear end portion of said carbon-steel tube;
  (h) providing a blockage cone at a rear end of said carbon-steel pipe;
  (i) providing a shroud positioned around the exterior of the rear end portion of said carbon-steel tube, said shroud having a flow deflector positioned at the front end of said shroud, (j) forming an annular region between said perforated side plates and the shroud which surrounds the rear end portion of said carbon-steel pipe;
  (k) forcing a substantial portion of the flow of the jet engine exhaust-cool air mixture through openings within said perforated side walls into said annular region, wherein said blockage cone assists in forcing said substantial portion of the flow of said jet engine exhaust-cool air mixture through the openings within said perforated side walls into said annular region;
  (l) slowing the average velocity of the jet engine exhaust-cool air mixture passing through said annular region which substantially reduces noise produced by said jet engine under going static testing; and
  (m) forcing said jet engine exhaust-cool air mixture exiting the front end of said shroud to reverse direction and flow in a rearward direction which is the same direction said jet engine exhaust-cool air mixture flows exiting the rear end of said shroud, wherein said flow deflector forces said jet engine exhaust-cool air mixture exiting the front end of said shroud in a reverse direction.

17. The method of claim 16 wherein the predetermined length of said carbon-steel pipe is approximately fifty feet and the predetermined diameter of said carbon-steel pipe is approximately six feet.

18. The method of claim 16 further comprising the steps of:
  (a) providing a plurality of longitudinal reinforcing bracing bars affixed to the outside surface of said carbon-steel pipe; and
  (b) providing a plurality of circumferential reinforcing bracing bars affixed to the outside surface of said carbon-steel pipe, wherein said plurality of longitudinal reinforcing bracing bars and said plurality of circumferential reinforcing bracing bars reduce and eliminate resonant frequencies which may otherwise occur in isolated regions of said carbon-steel pipe.

19. The method of claim 16 further comprising the steps of:
  (a) providing a test support structure having a first rectangular shaped base in a forward portion of the said test support structure and a second rectangular shaped base in a rear portion of said test support structure;
  (b) providing a pair of vertically orientated support cradles for each of said first and second rectangular shaped bases which are located near the front and rear end of said first and second rectangular shaped bases, wherein two sections of said carbon-steel pipe of said noise attenuation device rest on the support cradles of said first and second rectangular shaped bases and the two sections of said carbon-steel pipe; and
  (c) providing a front and back joining flange located with said carbon-steel pipe which attaches the two sections of said carbon-steel pipe are attached to each other.

20. The method of claim 19 further comprising the steps of:
  (a) providing a pair of clamping devices for each of said support cradles which secure said carbon-steel pipe to each support cradle of said first and second rectangular shaped bases; and
  (b) providing a pair of angled support members, angled at approximately forty five degrees for each of said support cradles, to insure stability of said cradles during the static testing of said jet engine.

* * * * *